(12) United States Patent
Yang

(10) Patent No.: US 7,136,637 B2
(45) Date of Patent: Nov. 14, 2006

(54) POWER MEASUREMENT SYSTEM COMPRISING PC AND VOLTAGE METER

(75) Inventor: Kuei Chi Yang, Hsinchu (TW)

(73) Assignee: D-Link Corporation, Hsinchu (TW)

(*) Notice: Subject to any disclaimer, the term of this patent is extended or adjusted under 35 U.S.C. 154(b) by 415 days.

(21) Appl. No.: 10/724,064

(22) Filed: Dec. 1, 2003

(65) Prior Publication Data
US 2005/0118994 A1   Jun. 2, 2005

(51) Int. Cl.
*H04Q 7/20* (2006.01)
(52) U.S. Cl. .............. 455/423; 455/424; 455/425; 455/67.11
(58) Field of Classification Search ............... 455/423, 455/424, 425, 67.11
See application file for complete search history.

(56) References Cited

U.S. PATENT DOCUMENTS 6,321,068 B1*  11/2001  Zamat ................ 455/69
2004/0203726 A1* 10/2004  Wei ................... 455/423

OTHER PUBLICATIONS

Agilent Technologies, Agilent E6701A GPRS Lab Application, Apr. 5, 2002, Agilent Tech., pp. 5-16.*

* cited by examiner

Primary Examiner—Quochien B. Vuong
Assistant Examiner—Christian A. Hannon
(74) Attorney, Agent, or Firm—Bacon & Thomas, PLLC

(57) ABSTRACT

The present invention is to provide a power measurement system comprising a PC and a voltage meter, which comprises a power to voltage converter to receive input signals from a wireless communication product to be tested and convert the input signals into voltage signals, a voltage meter to measure a voltage value of the voltage signals, and a PC to read the measured voltage value of the voltage meter and convert the read voltage value into an actual power based on a created calibration table. As an end, a correct power measurement is obtained.

1 Claim, 1 Drawing Sheet

POWER MEASUREMENT SYSTEM COMPRISING PC AND VOLTAGE METER

FIELD OF THE INVENTION

The present invention relates to power measurement and more particularly to an improved power measurement system comprising a PC (personal computer) and a voltage meter.

BACKGROUND OF THE INVENTION

The Internet, particularly WWW (World Wide Web) thereof, has known a rapid, spectacular development in recent years. WWW is used to provide a variety of multimedia services including voice, graphics, dynamic images, etc. in addition to a conventional e-mail service. Thus, a substantial amount of data is accompanied with the multimedia services. Hence, various network communication products having high performance are commercially available in which wireless communication products are the most popular ones among the market.

For designing and producing quality wireless communication products and ensuring that bandwidth occupied by the communication product is complied with the specifications, typically, an employee of a wireless communication product manufacturing company may measure power of a wireless communication product to be finished and calibrate the same, thereby ensuring that all products are defect free for complying with the specifications. For achieving this purpose, manufacturers of the art have to invest much money for establishing a power test station having a dedicate power meter in each assembly line. The power meter is responsible for measuring power of a wireless communication product to be finished and calibrating the same.

Typically, a power meter for measuring power may cost more than US$15,000. As such, the establishment of a number of power test stations in several assembly lines may cost at least US$ 300,000. This will inevitably greatly increase the cost of the establishment of assembly lines. Hence, many not so rich enterprises hesitate to invest the same for expansion. This has the drawback of delaying the normal delivery time if orders more than the normal production are received unexpectedly since all available assembly lines are full. Thus, the need for improvement still exists.

SUMMARY OF THE INVENTION

A primary object of the present invention is to provide a power measurement system comprising a PC and a voltage meter. The inexpensive power measurement system has advantages of simple operation, easy maintenance, eliminating the cost of buying many expensive equipment for testing a wireless communication product in the automatic production line, and significantly increasing the competitiveness of the wireless communication products in the market. Further, by utilizing the present invention, the above drawbacks of the prior art such as expensive power meters and high manufacturing cost of the wireless communication products can be overcome.

One object of the present invention is to employ a power to voltage converter to receive input signals from a wireless communication product to be tested and convert the input signals into voltage signals, a voltage meter to measure a voltage value of the voltage signals, and a PC to read the measured voltage value of the voltage meter and convert the read voltage value into an actual power based on a created calibration table. As an end, a correct power measurement is obtained.

Another object of the present invention is that for creating the calibration table a power meter is used to measure an actual output power of each of a plurality of channels of one of a certain series of wireless communication products and send the measured actual output power to the PC, the power to voltage converter and the voltage meter of the power measurement system of the present invention are used to measure an output voltage of one of the certain series of wireless communication products for obtaining a measured voltage of each channel, the PC is used to subtract the measured voltage from the actual output power to obtain a difference therebetween, and all differences are used to create the calibration table.

The above and other objects, features and advantages of the present invention will become apparent from the following detailed description taken with the accompanying drawings.

DETAILED DESCRIPTION OF THE PREFERRED EMBODIMENTS

Figure 1:
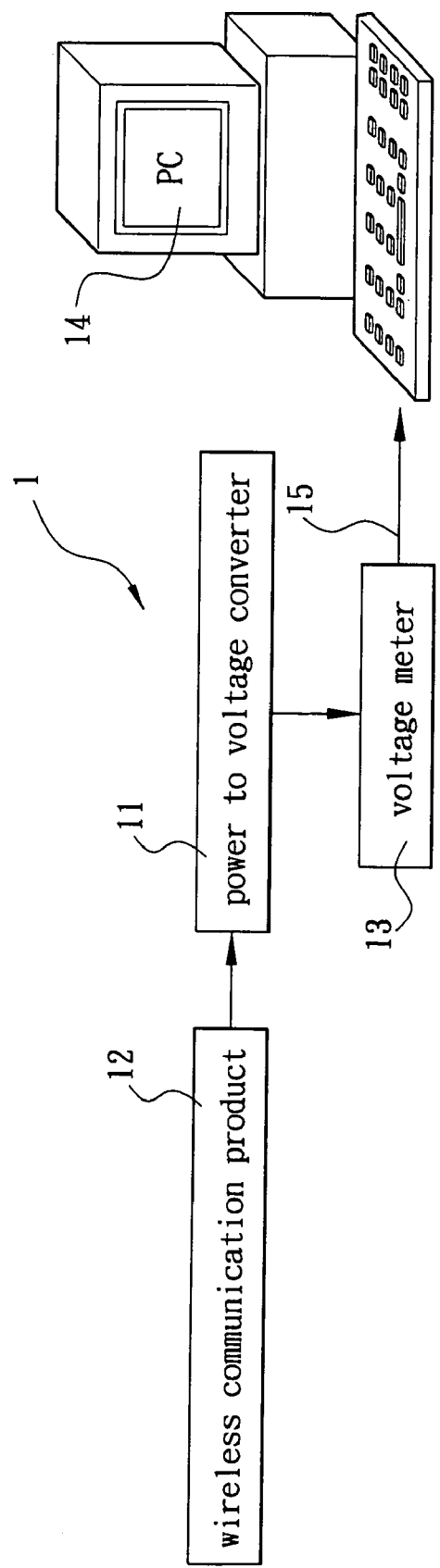
FIG. 1 is a block diagram of a preferred embodiment of power measurement system according to the invention.

Referring to FIG. 1, there is shown a power measurement system 1 in accordance with the invention. The power measurement system 1 comprises a power to voltage converter 11 for receiving input signals from a wireless communication product 12 to be tested and converting the input signals into voltage signals, and a voltage meter 13 for measuring a voltage value of the voltage signals. Hence, the invention simply further comprises a PC 14 for reading the measured voltage value of the voltage meter 13 via an interconnected communication interface 15 and converting the read voltage value into an actual power based on a created calibration table. As an end, a correct power measurement is obtained.

Again referring to FIG. 1, while the calibration table being created, a power meter (not shown) coupled to the PC 14 via an interface (such as a RS-232 interface) is used to measure the actual output power of each of a plurality of channels of one of a certain series of wireless communication products and send the measured data to the PC 14. Next, the power to voltage converter 11 and the voltage meter 13 of the power measurement system 1 of the invention are adapted to measure the output voltage of one of the certain series of wireless communication products. As such, a measured voltage of each channel is obtained so that the PC 14 can subtract the measured voltage from the actual output power to obtain a difference therebetween. All differences are in turn used to create the calibration table. In one embodiment of the invention, the power meter is used to measure the actual output power of a 802.11b wireless network card. The obtained actual power values of available channels are tabulated from minimum to maximum as below.

| Output power | Ch1 | Ch2 | Ch3 | Ch4 | Ch5 | Ch6 | Ch7 | Ch8 | Ch9 | Ch10 | Ch11 |
|---|---|---|---|---|---|---|---|---|---|---|---|
| Power1 | 0.0 | 0.5 | 0.6 | 0.8 | 0.4 | 0.2 | 1.0 | 1.1 | 0.3 | 0.2 | −1.0 |
| Power2 | 1.1 | 1.2 | 1.4 | 1.3 | 1.2 | 1.2 | 1.1 | 1.1 | 1.1 | 1.2 | 1.4 |
| Power3 | 1.5 | 1.7 | 1.9 | 1.8 | 1.6 | 1.7 | 1.5 | 1.6 | 1.5 | 1.7 | 1.9 |
| Power4 | 2.2 | 2.3 | 2.5 | 2.4 | 2.3 | 2.3 | 2.2 | 2.2 | 2.2 | 2.3 | 2.5 |
| Power5 | 2.7 | 3.4 | 3.5 | 3.5 | 3.1 | 3.4 | 2.7 | 2.9 | 2.7 | 3.4 | 3.5 |
| Power6 | 3.7 | 3.9 | 4.4 | 4.2 | 3.8 | 3.9 | 3.7 | 3.8 | 3.7 | 3.9 | 4.4 |
| Power7 | 4.9 | 4.4 | 6.6 | 5.5 | 4.7 | 4.4 | 4.9 | 4.8 | 4.9 | 4.4 | 6.6 |
| Power8 | 6.6 | 7.0 | 7.1 | 7.1 | 6.8 | 7.0 | 6.6 | 6.7 | 6.6 | 7.0 | 7.1 |
| Power9 | 7.5 | 7.3 | 7.4 | 7.4 | 7.4 | 7.3 | 7.5 | 7.5 | 7.5 | 7.3 | 7.4 |
| Power10 | 7.8 | 8.2 | 9.2 | 8.7 | 8.0 | 8.2 | 7.8 | 7.9 | 7.8 | 8.2 | 9.2 |
| Power11 | 9.1 | 8.9 | 9.7 | 9.3 | 9.0 | 8.9 | 9.1 | 9.1 | 9.1 | 8.9 | 9.7 |
| Power12 | 10.3 | 11.0 | 11.2 | 11.1 | 10.7 | 11.0 | 10.3 | 10.5 | 10.3 | 11.0 | 11.2 |
| Power13 | 12.4 | 13.0 | 13.3 | 13.2 | 12.7 | 13.0 | 12.4 | 12.6 | 12.4 | 13.0 | 13.3 |
| Power14 | 13.5 | 13.9 | 14.3 | 14.1 | 13.7 | 13.9 | 13.5 | 13.6 | 13.5 | 13.9 | 14.3 |
| Power15 | 15.5 | 16.0 | 15.3 | 15.7 | 15.8 | 16.0 | 15.5 | 15.6 | 15.5 | 16.0 | 15.3 |
| Power16 | 16.9 | 17.0 | 16.6 | 16.8 | 17.0 | 17.0 | 16.9 | 16.9 | 16.9 | 17.0 | 16.6 |
| Power17 | 17.5 | 17.6 | 17.9 | 17.8 | 17.6 | 17.6 | 17.5 | 17.5 | 17.5 | 17.6 | 17.9 |
| Power18 | 18.3 | 19.1 | 18.0 | 18.6 | 18.7 | 19.1 | 18.3 | 18.5 | 18.3 | 19.1 | 18.0 |
| Power19 | 19.3 | 19.8 | 19.5 | 19.7 | 19.6 | 19.8 | 19.3 | 19.4 | 19.3 | 19.8 | 19.5 |
| Power20 | 20.0 | 20.1 | 20.6 | 20.3 | 21.3 | 22.3 | 23.2 | 22.3 | 21.2 | 20.6 | 20.1 |

The PC 14 then reads the actual power value. Next, the power measurement system 1 of the invention is used to measure the actual power value of the 802.11b wireless network card. Voltage values of all channels measured by the voltage meter 13 in cooperation with the power to voltage converter 11 of the power measurement system 1 are tabulated as below.

| Measured voltage | Ch1 | Ch2 | Ch3 | Ch4 | Ch5 | Ch6 | Ch7 | Ch8 | Ch9 | Ch10 | Ch11 |
|---|---|---|---|---|---|---|---|---|---|---|---|
| Power1 | 0.5 | 0.7 | 0.6 | 0.6 | 0.5 | 0.5 | 0.6 | 0.6 | 0.5 | 0.5 | 0.4 |
| Power2 | 0.6 | 0.6 | 0.6 | 0.6 | 0.6 | 0.6 | 0.6 | 0.6 | 0.6 | 0.6 | 0.6 |
| Power3 | 0.7 | 0.8 | 0.7 | 0.7 | 0.7 | 0.7 | 0.7 | 0.7 | 0.7 | 0.7 | 0.7 |
| Power4 | 0.7 | 0.8 | 0.8 | 0.7 | 0.7 | 0.7 | 0.7 | 0.7 | 0.7 | 0.7 | 0.8 |
| Power5 | 0.8 | 0.9 | 0.9 | 0.8 | 0.8 | 0.8 | 0.8 | 0.8 | 0.8 | 0.8 | 0.9 |
| Power6 | 0.9 | 1.0 | 0.9 | 0.9 | 0.9 | 0.9 | 0.9 | 0.9 | 0.9 | 0.9 | 0.9 |
| Power7 | 1.0 | 1.0 | 1.2 | 1.1 | 1.0 | 0.9 | 1.0 | 1.0 | 1.0 | 0.9 | 1.2 |
| Power8 | 1.2 | 1.3 | 1.2 | 1.2 | 1.2 | 1.2 | 1.2 | 1.2 | 1.2 | 1.2 | 1.2 |
| Power9 | 1.3 | 1.3 | 1.2 | 1.2 | 1.2 | 1.2 | 1.3 | 1.2 | 1.3 | 1.2 | 1.2 |
| Power10 | 1.3 | 1.4 | 1.4 | 1.4 | 1.3 | 1.3 | 1.3 | 1.3 | 1.3 | 1.3 | 1.4 |
| Power11 | 1.4 | 1.5 | 1.5 | 1.4 | 1.4 | 1.4 | 1.4 | 1.4 | 1.4 | 1.4 | 1.5 |
| Power12 | 1.5 | 1.7 | 1.6 | 1.6 | 1.6 | 1.6 | 1.5 | 1.5 | 1.5 | 1.6 | 1.6 |
| Power13 | 1.7 | 1.9 | 1.8 | 1.8 | 1.8 | 1.8 | 1.7 | 1.8 | 1.7 | 1.8 | 1.8 |
| Power14 | 1.9 | 2.0 | 1.9 | 1.9 | 1.9 | 1.9 | 1.9 | 1.9 | 1.9 | 1.9 | 1.9 |
| Power15 | 2.1 | 2.2 | 2.0 | 2.1 | 2.1 | 2.1 | 2.1 | 2.1 | 2.1 | 2.1 | 2.0 |
| Power16 | 2.2 | 2.3 | 2.2 | 2.2 | 2.2 | 2.2 | 2.2 | 2.2 | 2.2 | 2.2 | 2.2 |
| Power17 | 2.3 | 2.4 | 2.3 | 2.3 | 2.3 | 2.3 | 2.3 | 2.3 | 2.3 | 2.3 | 2.3 |
| Power18 | 2.3 | 2.5 | 2.3 | 2.4 | 2.4 | 2.4 | 2.3 | 2.4 | 2.3 | 2.4 | 2.3 |
| Power19 | 2.4 | 2.6 | 2.5 | 2.5 | 2.5 | 2.5 | 2.4 | 2.4 | 2.4 | 2.5 | 2.5 |
| Power20 | 2.5 | 2.6 | 2.6 | 2.5 | 2.6 | 2.7 | 2.8 | 2.7 | 2.6 | 2.6 | 2.5 |

The PC 14 then reads the measured voltage. Next, subtract the measured voltage from the actual power for obtaining a difference therebetween. Next, all differences are used to create the calibration table as below.

| Calibration table | Ch1 | Ch2 | Ch3 | Ch4 | Ch5 | Ch6 | Ch7 | Ch8 | Ch9 | Ch10 | Ch11 |
|---|---|---|---|---|---|---|---|---|---|---|---|
| Power1 | −0.5 | −0.2 | 0.0 | 0.2 | −0.1 | −0.3 | 0.4 | 0.5 | −0.2 | −0.3 | −1.4 |
| Power2 | 0.5 | 0.6 | 0.8 | 0.7 | 0.5 | 0.6 | 0.5 | 0.5 | 0.5 | 0.6 | 0.8 |

-continued

| Calibration table | Ch1 | Ch2 | Ch3 | Ch4 | Ch5 | Ch6 | Ch7 | Ch8 | Ch9 | Ch10 | Ch11 |
|---|---|---|---|---|---|---|---|---|---|---|---|
| Power3 | 0.9 | 0.9 | 1.2 | 1.1 | 0.9 | 1.0 | 0.9 | 0.9 | 0.9 | 1.0 | 1.2 |
| Power4 | 1.5 | 1.5 | 1.8 | 1.7 | 1.5 | 1.6 | 1.5 | 1.5 | 1.5 | 1.6 | 1.8 |
| Power5 | 1.9 | 2.5 | 2.7 | 2.6 | 2.2 | 2.6 | 1.9 | 2.1 | 1.9 | 2.6 | 2.7 |
| Power6 | 2.8 | 2.9 | 3.5 | 3.2 | 2.9 | 3.0 | 2.8 | 2.9 | 2.8 | 3.0 | 3.5 |
| Power7 | 3.9 | 3.4 | 5.4 | 4.5 | 3.7 | 3.5 | 3.9 | 3.8 | 3.9 | 3.5 | 5.4 |
| Power8 | 5.4 | 5.7 | 5.9 | 5.8 | 5.6 | 5.8 | 5.4 | 5.5 | 5.4 | 5.8 | 5.9 |
| Power9 | 6.3 | 6.0 | 6.2 | 6.1 | 6.2 | 6.1 | 6.3 | 6.2 | 6.3 | 6.1 | 6.2 |
| Power10 | 6.5 | 6.8 | 7.8 | 7.3 | 6.7 | 6.9 | 6.5 | 6.6 | 6.5 | 6.9 | 7.8 |
| Power11 | 7.7 | 7.4 | 8.2 | 7.9 | 7.6 | 7.5 | 7.7 | 7.6 | 7.7 | 7.5 | 8.2 |
| Power12 | 8.8 | 9.3 | 9.6 | 9.5 | 9.1 | 9.4 | 8.8 | 8.9 | 8.8 | 9.4 | 9.6 |
| Power13 | 10.7 | 11.1 | 11.5 | 11.3 | 10.9 | 11.2 | 10.7 | 10.8 | 10.7 | 11.2 | 11.5 |
| Power14 | 11.7 | 11.9 | 12.4 | 12.2 | 11.8 | 12.0 | 11.7 | 11.7 | 11.7 | 12.0 | 12.4 |
| Power15 | 13.5 | 13.8 | 13.3 | 13.6 | 13.7 | 13.9 | 13.5 | 13.6 | 13.5 | 13.9 | 13.3 |
| Power16 | 14.7 | 14.7 | 14.4 | 14.6 | 14.8 | 14.8 | 14.7 | 14.7 | 14.7 | 14.8 | 14.4 |
| Power17 | 15.3 | 15.2 | 15.6 | 15.5 | 15.3 | 15.3 | 15.3 | 15.3 | 15.3 | 15.3 | 15.6 |
| Power18 | 16.0 | 16.6 | 15.7 | 16.2 | 16.3 | 16.7 | 16.0 | 16.2 | 16.0 | 16.7 | 15.7 |
| Power19 | 16.9 | 17.2 | 17.1 | 17.2 | 17.1 | 17.3 | 16.9 | 17.0 | 16.9 | 17.3 | 17.1 |
| Power20 | 17.5 | 17.5 | 18.0 | 17.8 | 18.7 | 19.6 | 20.4 | 19.6 | 18.6 | 18.0 | 17.6 |

In such a manner, the PC 14 can convert the read voltage value into an actual power based on the calibration table. As an end, a correct power measurement is obtained.

In view of the above, the invention simply assembles commercially available power to voltage converter 11 and voltage meter 13 together which in turn operate as commanded by the PC 14. As such, a desired power measurement system 1 is finished in a reduced cost. The power measurement system 1 has the advantages of simple operation, and easiness of component procurement, assembly, and maintenance. Further, the measured power value can be used for testing whether the output power of one of a variety of wireless communication products is complied with the specifications by a wireless communication product designer or manufacturer. Thus, the invention is very convenient in use.

While the invention has been described by means of specific embodiments, numerous modifications and variations could be made thereto by those skilled in the art without departing from the scope and spirit of the invention set forth in the claims.

What is claimed is:

1. A power measurement system, comprising:
a power to voltage converter for receiving input signals from a wireless communication product to be tested and converting the input signals into voltage signals;
a voltage meter coupled to the power to voltage converter, the voltage meter being operable to measure a voltage value of the voltage signals;
a PC coupled to the voltage meter via a communication interface, the PC being operable to read the voltage value measured by the voltage meter and convert the read voltage value into an actual power based on a created calibration table, thereby obtaining a correct power measurement,
a power meter; and
an interconnected interface for interconnecting the power meter and the PC,
wherein, for creating the calibration table, the power meter is operable to measure an actual output power of each of a plurality of channels of one of a predetermined series of wireless communication products and send the measured actual output power to the PC, the power to voltage converter and the voltage meter are operable to measure an output voltage of one of the predetermined series of wireless communication products for obtaining a measured voltage of each channel, the PC is operable to subtract the measured voltage from the actual output power to obtain a difference therebetween, and all differences are used to create the calibration table.

* * * * *